United States Patent

[11] 3,582,058

[72] Inventor Louis A. Hodges
 Tulsa, Okla.
[21] Appl. No. 725,263
[22] Filed Apr. 24, 1968
[45] Patented June 1, 1971
[73] Assignee Parker-Hannifin Corporation
 Cleveland, Ohio

[54] LINEAR-TYPE VIBRATION DAMPENER
 13 Claims, 3 Drawing Figs.
[52] U.S. Cl. ........................................................ 267/34
[51] Int. Cl. ................................................ B60g 15/02

[50] Field of Search............................................. 267/34,
 121, 151

[56] References Cited
UNITED STATES PATENTS
3,228,672 1/1966 Bresk et al. ..................... 267/34
3,263,983 8/1966 Bliven ........................... 267/34

Primary Examiner—James B. Marbert
Attorney—John N. Wolfram

ABSTRACT: A linear-type vibration dampener having liquid and spring resistance means acting in series and with the spring means telescoped over the liquid means for minimum overall length of the dampener.

PATENTED JUN 1 1971

3,582,058

INVENTOR
LOUIS A. HODGES

ATTORNEY
John N. Wolfram

# LINEAR-TYPE VIBRATION DAMPENER

BACKGROUND OF THE INVENTION

In vibration dampeners for aircraft use it is highly desirable that size and weight be kept to a minimum. Moreover, in particular applications, such as between the rotor mast and the pylon or supporting structure of a helicopter the axial length of the dampener should be as short as possible.

SUMMARY OF THE INVENTION

The present invention provides a linear acting vibration dampener that utilizes both liquid and spring resistance members acting in series in which the liquid resistance member comprises a piston and cylinder arrangement and the cylinder is telescoped within a coil-type spring resistance member to achieve minimum overall length. The cylinder is movable by liquid pressure in either axial direction when providing liquid dampening for movement of the piston and the cylinder engages the spring at either of its ends to compress the same regardless of the direction of axial travel of the cylinder.

DESCRIPTION

Figures 1, 2, 3:
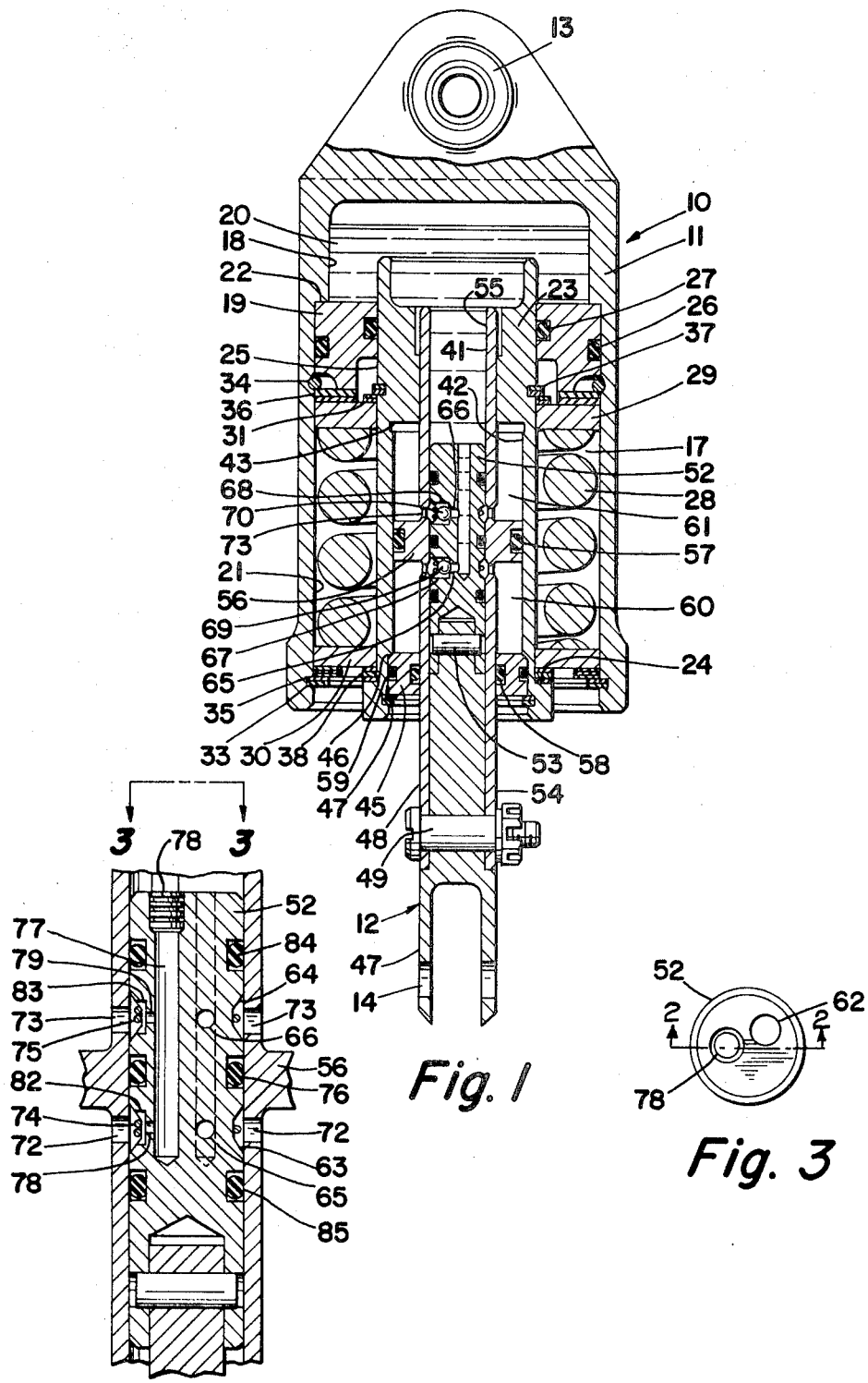
FIG. 1 is a longitudinal cross section view of the vibration dampener assembly.
FIG. 2 is a fragmentary cross-sectional view along the lines 2–2 of FIG. 3.
FIG. 3 is an end view of the spool along the lines 3–3 of FIG. 2.

The dampener 10 includes a housing 11 and a rod assembly 12 which have respective means 13 and 14 for attachment to two members, not shown, whose vibratory movements toward and away from each other are to be damped.

Housing 11 has a spring chamber 17 separated from a cavity 18 by a retainer 19. Cavity 18 serves as a reservoir for a supply of hydraulic liquid 20. Movably mounted within housing 11 is a cylinder 23 having an abutment 24 at its outer end and whose inner end 25 is a close sliding fit within retainer 19. Resilient O-rings 26, 27 seal retainer 19 relative to housing 11 and cylinder 23.

Telescoped over cylinder 23 is a coil spring 28 whose inner and outer ends bear respectively against washers 29 and 30 and which is retained and located within the housing by snap ring 33 and retainer 19. Shims 35, 36 permit precise axial adjustment of the spring within the housing and provide for the desired endwise clearance for the spring when the latter is in its free height or uncompressed condition. Snapring 34 holds retainer 19 within the housing when the spring and other internal parts are removed.

Washers 29, 30 have a close sliding fit within housing bore 21 and upon cylinder 23 and are retained on the latter between shoulder 24 and a snapring 37. Another set of shims 38 is provided for adjusting the clearance between washer 30 and shoulder 24 when spring 28 is uncompressed.

Cylinder 23 has a bore 41 and a counterbore 42 providing a shoulder 43. Bore 42 is closed by an end cap 45 that is held against a shoulder 46 in the cylinder by a snapring 47.

Mounted within cylinder 23 is rod assembly 12 that has a clevis member 47 connected to a piston 48 by a bolt 49 and which is also connected to a spool 52 by a pin 53. The inner and outer ends 54, 55 of piston 48 respectively have close sliding fits within retainer 45 and cylinder bore 41 and intermediate to these ends is a pistonhead 56 that has a close sliding fit within counterbore 42 and is sealed relative thereto by a packing ring 57. Retainer 45 is sealed relative to piston end 54 by a packing 58 and with respect to cylinder 23 by a packing 59.

Spool 52 has a blind drill hole 62 open to the inner end thereof which is connected to a pair of annular grooves 63, 64 in the outer surface of the spool by transverse openings 65, 66 and counterbores 67, 68. Located in the latter are check valve ball elements 69, 70 for opening and closing openings 65, 66. Grooves 63, 64 respectively register with a series of circumferentially spaced openings 72, 73 through piston ends 54, 55 on opposite sides of pistonhead 56. Each of the ball valves 69, 70 is retained in its seated position for closing openings 65, 66 by spring rings 74, 75. Leakage along the outer diameter of the spool between annular grooves 63, 64 is prevented by a resilient packing 76.

Spool 52 has another axially extending drill hole 77 that is blind at its lower end and closed by a plug 78 at the inner end of the spool. The spool has another pair of transverse openings 78, 79 that connect drill hole 77 with annular grooves 63, 64 via counterbores 82, 83. Leakage of fluid along spool 52 inwardly and outwardly of grooves 64, 63 is prevented by packing rings 84, 85.

OPERATION

FIG. 1 illustrates the position of the damper parts when piston rod 12 is in a midposition relative to housing 11 and spring 28 is under no compressive load. The damper is intended for installation with its longitudinal axis in substantially a vertical position, as shown. At this time hydraulic fluid fills chambers 60, 61 and all the passages in spool 52 and piston end 55 located between such chambers and cavity 18. The hydraulic fluid also fills most of cavity 18 but there is a trapped volume of air at the upper end thereof.

When a force is applied to piston rod 12 for moving the same either farther into or out of housing 11, such movement is resisted by the liquid in chamber 61 in the first instance and in chamber 60 in the second instance and also by compressive force applied to spring 28, the resistive forces of the liquid and the spring being in series.

Thus, when external forces are applied to piston rod 12 and housing 11 tending to move rod 12 further into housing 11, pistonhead 56 moves toward cylinder shoulder 43 and forces liquid from chamber 61 into chamber 60 via a restricted flow path provided by openings 73, annular groove 64, opening 79, passage 77, opening 78, groove 63, and openings 72. Because of the restricted nature of this flow path the liquid within chamber 61 becomes pressurized and acts upon the adjacent face of pistonhead 56 to resist such inward movement of rod 12. The pressurized fluid in chamber 61 also acts on shoulder 43 of cylinder 23 to move cylinder 23 inwardly. Such inward movement is transmitted to the outer end of spring 28 through cylinder shoulder 24, shims 38 and washer 30 to compress the spring and thus further to resist inward movement of rod 12. Because it is the pressure of fluid within chamber 61 that causes compression of spring 28, the resistance to inward movement of rod 12 by the spring and by the fluid pressure within chamber 61 are in series with each other.

When forces are applied to rod 12 and housing 11 tending to move the rod out of the housing, pistonhead 56 forces liquid out of chamber 60 into chamber 61 via the passages mentioned in the reverse operation described above and the liquid in chamber 60 becomes pressurized for resisting such outward movement of rod 12 by acting upwardly on piston 56. The pressurized liquid in chamber 60 also acts downwardly on retainer 45 and this downward pressure is transmitted to the inner end of spring 28 via snap ring 47, cylinder 23, snapring 37, shims 31 and washer 29. At this time the outer end of spring 28 remains stationary relative to housing 11 because washer 30 is backed up by shims 35 and snapring 33. Thus, in this instance also the outward movement of rod 12 is resisted by force provided by liquid under pressure and a spring acting in series.

Check valves 69 and 70 trap the hydraulic liquid within chambers 60, 61 but in the event there is any leakage therefrom one or the other of check valves 69 or 70 will open slightly to admit more liquid to the respective chambers from the supply in cavity 20 via the hollow inner end 55 of the piston, drill hole 62, and openings 65 or 66. Although cavity 18 holds a supply of liquid for replenishing chambers 60, 61 in this manner, the cavity is not completely filled with liquid but at all times will contain a volume of air above the liquid. This air compresses and expands during inward and outward movements of piston rod 12 to avoid hydraulic lock.

I claim:

1. A vibration dampener comprising a housing and a rod axially movable relative to each other, each having means for attachment to members movable toward and away from each other, separate liquid and spring resistance means serially connected to each other in dependent relationship and operatively connected to the housing and rod so as to resist said axial movement, and said spring means being telescoped over said liquid means.

2. The dampener of claim 1 in which said liquid resistance means includes a cylinder axially movable within the housing and engageable with said spring for compressing the same.

3. The dampener of claim 1 in which said liquid resistance means includes a cylinder axially movable within the housing and engageable at each of its ends with a respective end of said spring for compressing the same regardless of the direction of axial movement of the cylinder.

4. The dampener of claim 3 in which said housing has inner and outer abutment means engageable with a respective end of the spring means to hold such respective end stationary when the opposite end of the spring is engaged by the cylinder for compressing said spring.

5. The dampener of claim 1 in which said liquid resistance means includes a pair of cylinder chambers and said housing contains a reservoir for storing a supply of liquid, and there are valved passages connecting the chambers with said reservoir.

6. A vibration dampener comprising a housing and a rod with each having means for attachment to members movable toward and away from each other, a cylinder movable within the housing, a piston on the rod and within the cylinder and dividing the cylinder into two liquid containing chambers with each chamber having an end wall provided by the cylinder, a restricted passage connecting the chambers, a coil spring surrounding the cylinder and normally having each of its ends engaging a corresponding abutment on the housing, said cylinder having an abutment at each of its ends engageable with a respective end of the spring whereby movement of the piston in either axial direction causes an increase in liquid pressure in one or the other of said chambers and such increased liquid pressure acts on the respective end wall to move the cylinder and cause the spring to be compressed.

7. The dampener of claim 6 in which the housing has a cavity providing a reservoir for liquid, and there is a restricted passage means connecting the reservoir with one of said chambers.

8. The dampener of claim 1 in which said spring is free of compression when engaged at each of its ends by the housing abutments.

9. The dampener of claim 7 in which said restricted passage comprises a slight clearance between the rod and a bore in said cylinder.

10. The dampener of claim 6 in which said restricted passage is through said rod.

11. The dampener of claim 6 in which said piston is hollow and there is a spool mounted therein, and said restricted passage is through the piston and spool.

12. The dampener of claim 6 in which said housing has a cavity that serves as a reservoir for liquid, and valve-controlled passages connecting said cavity with each of said chambers, said valves permitting flow of liquid only from said cavity to the respective chamber.

13. The dampener of claim 12 in which said housing has a chamber in which said spring is contained, and sealing means separating said cavity from said spring chamber.